United States Patent
Reaume

(10) Patent No.: US 9,625,303 B2
(45) Date of Patent: Apr. 18, 2017

(54) DIPSTICK ASSEMBLY AND METHOD OF FORMING THE SAME

(71) Applicant: FORD GLOBAL TECHNOLOGIES, LLC, Dearborn, MI (US)

(72) Inventor: Alan Charles Reaume, South Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 14/712,954

(22) Filed: May 15, 2015

(65) Prior Publication Data

US 2016/0334260 A1 Nov. 17, 2016

(51) Int. Cl.
*G01F 23/04* (2006.01)

(52) U.S. Cl.
CPC .................. *G01F 23/04* (2013.01)

(58) Field of Classification Search
CPC ....................................................... G01F 23/04
USPC .................................... 33/722–730
See application file for complete search history.

(56) References Cited

U.S. PATENT DOCUMENTS

| | | | | |
|---|---|---|---|---|
| 4,301,597 A * | 11/1981 | Midorikawa | ........... | G01F 23/04 33/729 |
| 4,476,714 A * | 10/1984 | Barry | ...................... | G01F 23/22 340/450.3 |
| 4,942,669 A * | 7/1990 | Schnedl | ................ | G01F 23/045 33/725 |
| 5,025,569 A * | 6/1991 | Lalevee, Sr. | ............ | G01F 23/04 33/726 |
| 5,241,753 A * | 9/1993 | Lalevee, Sr. | ............ | G01F 23/04 33/722 |
| 2003/0066566 A1* | 4/2003 | Sundqvist | ............... | G01F 23/04 138/89 |
| 2004/0078914 A1 | 4/2004 | Walker | | |
| 2004/0214672 A1 | 10/2004 | Thomas et al. | | |
| 2005/0241171 A1* | 11/2005 | Oyama | .................... | G01F 23/04 33/722 |
| 2010/0018308 A1* | 1/2010 | Liimatta | ................. | G01F 23/04 73/290 B |
| 2015/0135828 A1* | 5/2015 | Salter | ...................... | G01F 23/04 73/293 |
| 2016/0187178 A1* | 6/2016 | Itoo | ......................... | G01F 23/04 33/726 |

FOREIGN PATENT DOCUMENTS

CN 101865007 A 10/2010

OTHER PUBLICATIONS

AIM Plastics, Custom Plastic Injection Molding, Mar. 18, 2015, published via www.google.com, total 1 page.
RTP Company, Nylon Bondable Thermplastic Vulcanizate, Mar. 29, 2015, published via www.hpcompany.com, total 1 page.
Michael Hansen, Overmolding: A Multifaceted Medical Device Technology, Medical Device Diagnostic Industry, Jan. 2006, total 5 pages.

* cited by examiner

*Primary Examiner* — G. Bradley Bennett
(74) *Attorney, Agent, or Firm* — LeClairRyan

(57) ABSTRACT

A dipstick assembly includes a handle and a dipstick contacting the handle and being supported thereby, where the handle includes a waist portion including a first material and a head portion including a second material, the first material including a thermoplastic elastomer.

20 Claims, 2 Drawing Sheets

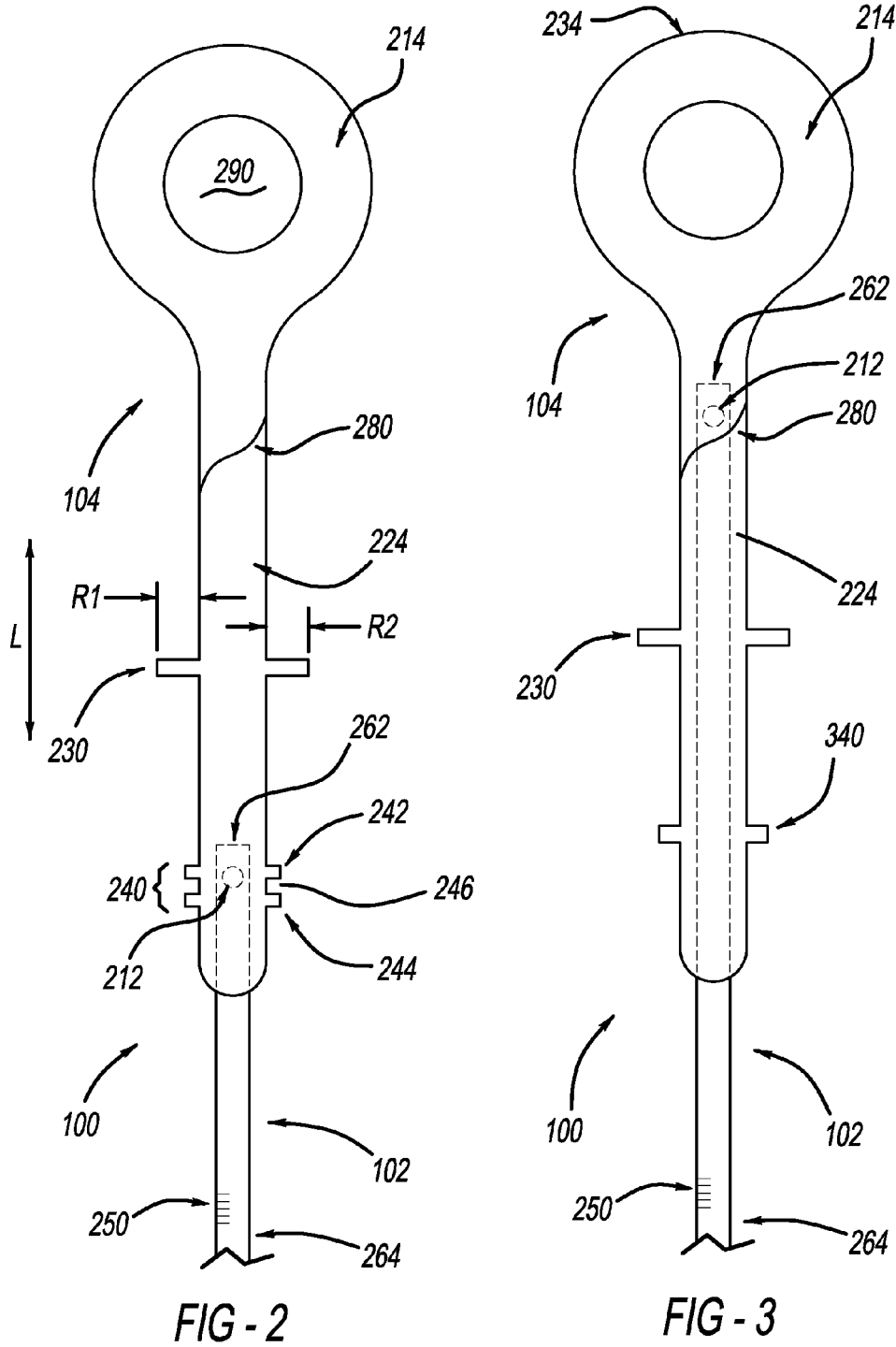

DIPSTICK ASSEMBLY AND METHOD OF FORMING THE SAME

TECHNICAL FIELD

The disclosed inventive concept relates generally to a dipstick assembly and a method of forming the same.

BACKGROUND

In an engine environment, there may be a number of rotating components that need oil lubrication. It is advisable to ensure a suitable oil content in the engine environment. To achieve this, one may use a dipstick to check for engine oil levels from time to time.

An example of a dipstick is illustrated in publication US2004/0078914 which discloses a dipstick having a swiping shaft.

Another example of a dipstick is illustrated in publication CN101865007 which discloses a dipstick having a rubber side vent.

SUMMARY

In one or more embodiments, the present invention provides a dipstick assembly including a handle including a waist portion including a first material and a head portion including a second material, the first material including a thermoplastic elastomer, and a dipstick contacting and being supported on the handle.

In another embodiment, the present invention provides a dipstick assembly including a dipstick including a proximal end portion and a distal end portion spaced apart from the proximal end portion, the distal end portion including one or more reading marks, and a handle including a first material and contacting the proximal end portion of the dipstick, the first material including a thermoplastic elastomer.

In yet another embodiment, the present invention provides a method of forming a dipstick assembly including contacting a dipstick with a fluidic first material to form a waist portion via molding, the waist portion as formed contacting the dipstick, and contacting the waist portion with a fluidic second material to from a head portion via molding, the head portion as formed contacting the waist portion and including a thermoplastic elastomer.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference should now be made to the one or more embodiments illustrated in greater detail in the accompanying drawings and described below wherein:

FIG. 2 illustratively depicts a plane view of the dipstick assembly referenced in FIG. 1; and FIG. 3 illustratively depicts an alternative plane view of the dipstick assembly referenced in FIG. 1.

DETAILED DESCRIPTION OF ONE OR MORE EMBODIMENTS

Figure 1:
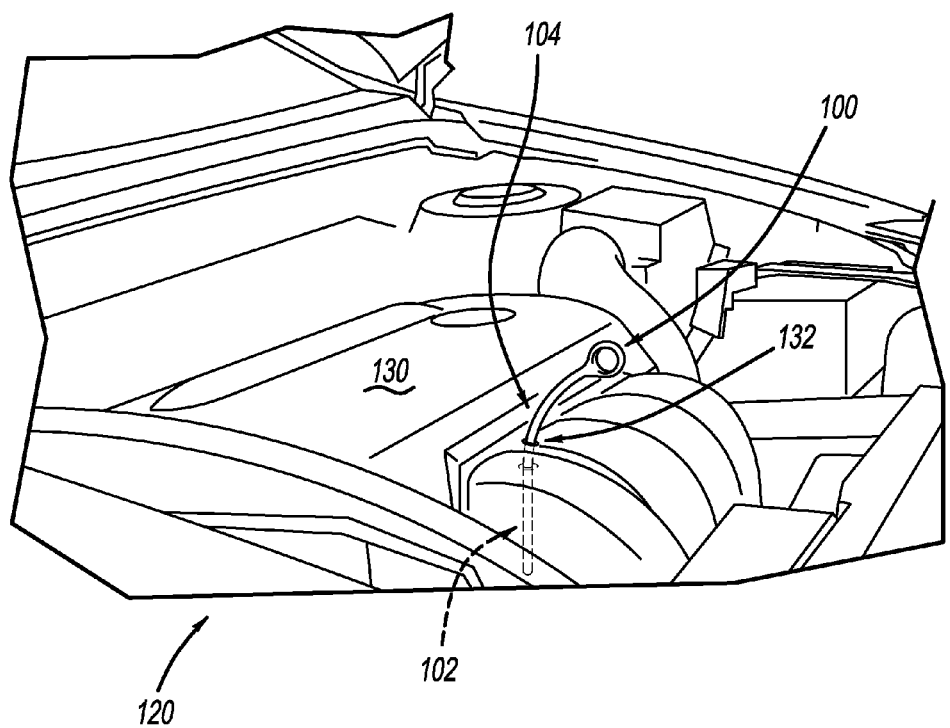
FIG. 1 illustratively depicts a perspective view of a dipstick assembly in view of an engine environment in one or more embodiments.

As referenced in the figures, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

As is detailed herein elsewhere, the present invention in one or more embodiments is believed to be advantageous in providing a durable dipstick assembly particularly suitable for use in situations where a relatively long and extended handle may be required of the dipstick assembly. In particular, the handle may be configured to include a thermoplastic elastomer positioned for one or more portions of the handle that may be prone to bending and hence potential breakage due to use.

In one or more embodiments, and as illustratively depicted in FIG. 1 and FIG. 2, a dipstick assembly generally shown at 100 is depicted in relation to an engine environment generally shown at 120 and positioned for oil level checkup. Certain engine types, possibly due to their size, operation and positions relative to surrounding components in the engine environment 120, may require a dipstick of a certain length to be able to reach an oil pan (not shown) and hence for the oil check be carried out properly. The present invention in one or more embodiments is advantageously positioned to accommodate the need for a relatively extended dipstick while reducing the likelihood of such dipstick being susceptible to unnecessary breakage particularly over portions thereof to contact around an entry area 132 of an engine 130.

With further reference to FIG. 2, the dipstick assembly 100 includes a handle 104 and a dipstick 102 contacting and being supported on the handle 104, where the handle 104 includes a waist portion 224 including a first material (not shown) and a head portion 214 including a second material (not shown), and where the first material includes a thermoplastic elastomer. The dipstick 102 is depicted to be defined between its proximal end portion 262 and distal end portion 264, where one or more reading marks 250 are present on the dipstick 102 at a location closer to the distal end portion 264 than to the proximal end portion 262.

The term "elastomer" may refer to any member of a class of polymeric substances that possess the quality of elasticity, for instance, the ability to regain shape after deformation.

Not all polymers have the amount of internal flexibility to be extensible and elastic. In order to have these properties, polymers should have relatively little internal hindrance to the random motion of their monomer subunits or they should not be glassy. On release from being extended, they should also be able to return to a disordered state by random motions of their repeating units. Polymers that can do so may be termed elastomers. All others may be termed plastics or resins.

The term "thermoplastic elastomer" may refer to a polymer or polymeric blend including one or more elastomers and one or more non-elastomers such as plastic or resin polymers.

Non-limiting examples of the elastomers that may be used to form the thermoplastic elastomer of the first material mentioned herein include cis-polyisoprene or natural rubber, cis-polybutadiene or butadiene rubber, styrene-butadiene rubber which is a copolymer of styrene and butadiene, and ethylene-propylene monomer which is a copolymer of ethylene and propylene. Also employable are elastomers that may be produced synthetically from derivatives of petroleum and natural gas. Further employable elastomers may include polyacrylate, fluorocarbons and ethylene acrylic elastomers. A non-limiting commercial source of the ethylene acrylic elastomers is Vamac® from Dupont.

Non-limiting examples of the non-elastomers or plastic polymer used to form the thermoplastic elastomer may include nylon 6 or polycaprolactam, nylon 6-6 which is a polymer of hexamethylenediamine and adipic acid, polypropylene and polystrene.

To form the thermoplastic elastomer, a non-limiting method may include forming a polymeric blend of one or more herein mentioned elastomers such as rubber with one or more herein mentioned plastic polymers such as polypropylene or polystyrene so as to retain the resilience of rubber while the resultant product capable of being remolded and reprocessed upon the application of heat.

In certain embodiments, the thermoplastic elastomer includes polyacrylate rubber which itself includes rubber in the rubber phase and nylon 6 in the plastic phase. A non-limiting commercial source of the polyacrylate rubber is Zeotherm®, which is a thermoplastic vulcanizate, from Zeon Chemicals of Louisville, Ky.

As a non-limiting example of the thermoplastic elastomer of the first material mentioned herein, Santoprene® consists of a mixture of approximately 60 parts ethylene-propylene-diene monomer copolymer with 40 parts polypropylene, which may alternatively be referred as polyolefin-based thermoplastic vulcanizates (TPV's).

In certain particular embodiments, the waist portion 224 includes or is formed of a thermoplastic elastomer that is also oil resistant and compatible with a nylon type of polymer to facilitate co-injection formation of the dipstick assembly 100. Without wanting to be limited to any particular theory, a blended polymeric composition as present in the waist portion 224 according to certain embodiments is believed to be synergistically beneficial in that the non-elastomer polymeric component of the blend, such as a nylon type of polymer, helps increase the compatibility between the head portion 214 and the waist portion 224 both in material and molding formation. In addition, the elastomer polymeric component of the blend, such as one or more of the thermoplastic elastomers mentioned herein elsewhere, helps increase the oil resistance of the handle 104 as a whole and hence improves its performance longevity.

Because the second material is employed to form the head portion 214 for finger access and does not require any particular amount of flexibility, the second material may merely be a polymeric material suitable for molding and may be relatively cheap in cost. The second material may include nylon type of polymers, for instance polymers formed out of hexamethylenediamine and adipic acid, or nylon 6-6. The second material may also include another nylon type of polymers, such as polycaprolactam, or nylon 6. Both these two nylon compositions are believed to be plastics and therefore not elastomers or thermoplastic elastomers. However, and as mentioned herein elsewhere, the second material is compatible in molding with the first material to realize a good bonding between the head portion 214 and waist portion 224.

In certain embodiments, the head portion 214 includes or is formed of a nylon type polymer such as nylon 6 and nylon 6-6, which are believed to be plastics and are therefore not thermoplastic elastomer. In certain embodiments, the handle portion 104 and the head portion 214 thereof in particular may be molded in a relatively visible color, such as a bright yellow or "standard yellow", to match one or more of the customer interface components such as fill caps, prop rods and other dipsticks. This configuration may be carried out with relatively enhanced ease as certain polymers such as nylon type polymer may be readily obtained in color yellow.

Referring back to FIG. 2, the head portion 214 of the handle 104 may be configured to have a finger loop 290 for easy access by an operator. The finger loop 290 may be of any suitable shape and/or size dimension. Optionally the finger loop 290 may be eliminated for the employment of other access-friendly structures (not shown) extending from the handle portion 214, such as a key-ring like structure, a groove, and an extending tongue.

Referring back to FIG. 2, the head portion 214 may be distinguished from the waist portion 224 via a division section 280, which in certain embodiments may be an overlapping intersection. While at least theoretically dividing the handle 104 into the head portion 214 and the waist portion 224, the division section 280 is not limited to the position or the shape as illustratively depicted in FIG. 2 or FIG. 3 mentioned herein elsewhere. A general rule of thumb may be that the division section 280 should be positioned to allow for ample volume of the waist portion 224 to contact the edges or rims of the entry area 132 of the engine 130 such that relatively enhanced flexibility imparted by the waist portion 224 helps reduce breakage of the handle 104 altogether. Moreover, and as mentioned herein elsewhere, the divisional section 280 may see differential divisions along a thickness direction. This differential division may be realized in situations such as when the head portion 214 is formed via over-molding onto a pre-formed waist portion 224, and vice versa.

Referring back to FIG. 2, the dipstick 102 contacts and hence is supported at the waist portion 224 of the handle 104. The waist portion 224 may be formed by molding onto the dipstick 102. Optionally a hole 212 may be formed in the dipstick 102 to receive during molding a portion of the molding material that eventually transforms to the waist portion 224. This optional structure is believed to increase the bond and integrity between the dipstick 102 and the handle 104 as a whole. One or more additional holes 212 may be employed, for instance, to enhance the bonding connection between the dipstick 102 and the handle 104.

In one or more embodiments, and as illustratively depicted in FIG. 2, the handle 104 further includes a stop portion 230 extending integrally and radially out from the waist portion 224 to position the dipstick 102 relative to the engine 130 and its oil sump in particular. Though the stop portion 230 is illustratively depicted to be at a middle position of the handle 104, the location of the stop portion 230 may be varied according to particular application. Moreover, the stop portion 230 is to be of a radial diameter sufficient enough so as not to be easily forced into a dipstick tube leading to the engine 130 via the entry area 132. Therefore the stop portion 230 functions as a stop for positioning the dipstick assembly 100 at a predetermined location when fully engaged via the entry area 132.

The stop portion 230 may be formed via the same molding procedure that causes the waist portion 224 to form. Accordingly the stop portion 230 is integral to the waist portion 224 both in material and construction and therefore is provided with the relatively enhanced level of flexibility and reduced tendency of breakage.

The stop portion 230 may be provided with a radial dimension R1 and R2 along a radial direction. The radial dimension R1 may be the same as or different from the radial dimension R2, with any values suitable for the intended purpose of the stop portion 230, which is to help position the dipstick assembly 100 as a whole relative to the entry area 132 of the engine 130, for instance, to prevent an unwanted over-entry of the dipstick assembly 100 into the engine oil sump.

With further reference to FIG. 2, the handle 104 further includes a seal portion 240 extending integrally and radially out from the waist portion 224. The seal portion 240 is so positioned such that the stop portion 230 is between the head portion 214 and the seal portion 240.

Like the stop portion 230, the seal portion 240 may be formed by molding along with the waist form 224. Thus the seal portion 240 carries with its formation the level of flexibility imparted by the thermoplastic elastomer. As the seal portion 240 may be integrally formed via molding and because the thermoplastic elastomer imparts a relatively enhanced level of flexibility and durability, the seal portion 240 is believed to function as a seal against oil leakage. This structure or configuration is believed to present a departure from certain existing designs which otherwise require the use of separate and additional O-rings. With the elimination of such O-rings, the dipstick assembly 100 is believed to be provided with additional level of cost efficiency and operation simplicity.

Referring back to FIG. 2, the seal portion 240 may be configured to include spaced apart first and second seal members 242, 244. The seal portion 240 may of course in certain other embodiments include less or more than two seal members. Because one of both of the seal members 242, 244 may be integral in material and structure to the waist portion 224, one or both of the seal members 242, 244 may function independently as a seal. When both are as a seal, the sealing effect may be enhanced. Noticeable from FIG. 2 is a void space 246 positioned between the first and second seal members 242, 244 along the longitudinal direction L. When one or both the seal members 242, 244 function as a seal themselves, any additional sealing device such as an O-ring is no longer needed for instance to be placed in the void space 246. However, one may choose to use such an O-ring between the first and second seal members as he/she wishes.

Away from the hole 212, and as illustratively depicted in FIG. 2, the dipstick 102 is presented with one or more reading marks 250.

While being designed to include or be formed of the second material, the head portion 214 may in certain embodiments include also the first material, albeit to a lesser degree in comparison to the waist portion 224. For instance, while the waist portion 224 includes more than 50, 60, 70, 80 or 90 percent by weight the first material, the head portion 214 includes no more than 50, 40, 30, 20 or 10 percent by weight the first material. This arrangement may be beneficial to provide desirable amount of material continuity and priming when the head and waist portions 214, 224 are formed via a two-shot molding process.

Referring back to FIG. 2, and as mentioned herein elsewhere, the dipstick 102 may be supported or contact a lower portion of the waist portion 224. It is believed to be beneficial in reducing the length of the dipstick 102, for instance at or near the seal portion 240 but below the stop portion 230, for consideration of economic use of dipstick material which tends to be metallic and hence costly. In certain embodiments and as illustratively depicted in FIG. 3, however, a proximal end 262 of the dipstick 102, which is near the hole 212, may be positioned way above a seal portion 340 and be relatively closer to a tip 234 of the handle 104. Without wanting to be limited to any particular theory, this configuration may be beneficial to impart additional level of mechanical strength in certain instances.

Referring back to FIG. 1 and further in view of FIGS. 2 and 3, a non-limiting method may be provided to form the dipstick assembly 100. In this method, a fluidic first material is employed to contact the dipstick 102 to form a waist portion 224 via molding. After and possibly during the molding process, the fluidic first material transforms and particularly polymerizes into the first material mentioned herein elsewhere. As formed, the waist portion 224 contacts and supports the dipstick 102 in a configuration such as one depicted in FIG. 2 or FIG. 3. As mentioned herein elsewhere, the hole 212 present on the dipstick 102 helps enhance the connection between the dipstick 102 and the handle 104 as a whole.

Then, a fluidic second material is employed to contact the waist portion 224 to form the head portion 214. After and possibly during the molding process, the fluidic second material transforms and particularly polymerizes into the second material mentioned herein elsewhere. As formed, the head portion 214 is formed to contact the waist portion 224 in a configuration such as one depicted in FIG. 2 or FIG. 3. As mentioned herein elsewhere, there may be physical overlap between the first material of the waist portion 224 and the second material of the head portion 214. Moreover, and as mentioned herein elsewhere, a comparably smaller weight percent of the fluidic second material may be added to the fluidic first material before and/or during the molding procedure for forming the waist portion 224. Similarly a comparably smaller weight percent of the fluidic second material may be added to the fluidic second material before and/or during the molding procedure for forming the head portion 214.

While the waist portion 224 is formed by molding, the stop portion 230 may be formed concurrently and integrally therewith, as mentioned herein elsewhere. This may be carried out via a forming mold with conforming shapes corresponding to the waist portion 224 and the stop portion 230, and the molding is effected via a single shot of the same material. Accordingly, the molding procedure is simplified and the resultant structure demonstrates relatively enhanced strength at least due to the material continuity from the integral molding.

As mentioned herein elsewhere, the seal portion 240 may be formed integrally, similar to the stop portion 230, onto the waist portion 224. Accordingly the forming mold may also be configured to present a cavity corresponding to the seal portion 240. Once the molding is completed, the resultant waist portion 224 is presented with the stop portion 230 and the seal portion 240, both being integral to the waist portion 224.

In one or more embodiments, the present invention as set forth herein is believed to have overcome certain challenges associated with unwanted breakage of dipsticks with extended length. However, one skilled in the art will readily recognize from such discussion and from the accompanying drawings and claims that various changes, modifications and variations can be made therein without departing from the true spirit and fair scope of the invention as defined by the following claims.

What is claimed is:

1. A dipstick assembly, comprising:
   a handle including a waist portion including a first material and a head portion including a second material, the first material including a thermoplastic elastomer;
   a dipstick contacting and being supported on the handle.

2. The dipstick assembly of claim 1, wherein the dipstick contacts the waist portion of the handle.

3. The dipstick assembly of claim 1, wherein the thermoplastic elastomer of the first material is a blend of one or more elastomers and one or more plastic polymers.

4. The dipstick assembly of claim 1, wherein the second material includes one or more plastic polymers.

5. The dipstick assembly of claim 1, wherein the handle further includes an overlapping intersection positioned between the head and waist portions, the overlapping portion including both a portion of the first and second materials.

6. The dipstick assembly of claim 1, wherein the handle further includes a stop portion extending integrally and radially out from the waist portion.

7. The dipstick assembly of claim 1, wherein the handle further includes a seal portion extending integrally and radially out from the waist portion.

8. The dipstick assembly of claim 7, wherein the seal portion includes first and second seal members positioned spaced apart from each other.

9. The dipstick assembly of claim 1, wherein the dipstick includes one or more reading marks, the waist portion being positioned between the head portion and the one or more reading markers.

10. A dipstick assembly, comprising:
   a dipstick including a proximal end portion and a distal end portion spaced apart from the proximal end portion, the distal end portion including one or more reading marks; and
   a handle including a first material and contacting the proximal end portion of the dipstick, the first material including a thermoplastic elastomer.

11. The dipstick assembly of claim 10, wherein the thermoplastic elastomer of the first material is a blend of one or more elastomers and one or more plastic polymers.

12. The dipstick assembly of claim 10, wherein the handle further includes a second material different from the first material.

13. The dipstick assembly of claim 12, wherein the handle includes a head portion and a waist portion positioned next to the head portion, the waist portion including at least portion of the first material and the head portion including at least a portion of the second material.

14. The dipstick assembly of claim 10, wherein the handle includes a head portion, a waist portion positioned next to the head portion, and a seal portion extending integrally and radially out from the waist portion.

15. The dipstick assembly of claim 14, wherein the handle further includes a stop portion extending integrally and radially out from the waist portion, the seal portion being positioned between the stop portion and the distal end portion of the dipstick.

16. A method of forming a dipstick assembly, comprising,
   contacting a dipstick with a fluidic first material to form a waist portion via molding, the waist portion as formed contacting the dipstick; and
   contacting the waist portion with a fluidic second material to form a head portion via molding, the head portion as formed contacting the waist portion and the first material including a thermoplastic elastomer.

17. The method of claim 16, wherein the dipstick is provided to include a hole to receive there-through a portion of the fluidic first material.

18. The method of claim 17, further comprising integrally forming via molding a seal portion to extend radially out from the waist portion.

19. The method of claim 18, further comprising integrally forming via molding a stop portion to extend radially out from the waist portion, the stop portion being positioned between the head portion and the seal portion.

20. The method of claim 16, wherein the head portion and the waist portion are formed with an overlapping intersection.

* * * * *